US011103073B1

(12) United States Patent
 Hertlein

(10) Patent No.: US 11,103,073 B1
(45) Date of Patent: Aug. 31, 2021

(54) SEAT ASSEMBLY FOR A BUCKET

(71) Applicant: John Andrew Hertlein, Gahanna, OH (US)

(72) Inventor: John Andrew Hertlein, Gahanna, OH (US)

( * ) Notice: Subject to any disclaimer, the term of this patent is extended or adjusted under 35 U.S.C. 154(b) by 0 days.

(21) Appl. No.: 16/814,381

(22) Filed: Mar. 10, 2020

Related U.S. Application Data

(60) Provisional application No. 62/817,157, filed on Mar. 12, 2019.

(51) Int. Cl.
| A47C 7/62 | (2006.01) |
| A01K 97/22 | (2006.01) |
| A47C 3/18 | (2006.01) |
| B65D 51/24 | (2006.01) |
| A47C 13/00 | (2006.01) |
| B65D 25/20 | (2006.01) |
| A47C 4/02 | (2006.01) |

(52) U.S. Cl.
CPC ............. *A47C 7/628* (2018.08); *A47C 3/18* (2013.01); *A47C 4/02* (2013.01); *A47C 13/00* (2013.01); *B65D 25/20* (2013.01); *B65D 51/24* (2013.01)

(58) Field of Classification Search
CPC ........ A47C 7/628; A47K 13/242; A47J 47/18; A01K 97/22
See application file for complete search history.

(56) References Cited

U.S. PATENT DOCUMENTS

| 3,114,574 A | * | 12/1963 | Pryale | A47C 7/62 |
| | | | | 312/235.2 |
| 3,751,845 A | * | 8/1973 | van Leeuwen | A01K 97/06 |
| | | | | 43/56 |
| 4,295,680 A | * | 10/1981 | Grasso | A01K 97/22 |
| | | | | 190/11 |
| 4,361,356 A | * | 11/1982 | Tunick | A47C 13/00 |
| | | | | 206/523 |
| 4,379,587 A | * | 4/1983 | Duncan | A01K 97/01 |
| | | | | 297/130 |
| 4,387,927 A | | 6/1983 | Fahey | |
| 4,773,709 A | * | 9/1988 | Slinkard | B63B 29/04 |
| | | | | 114/363 |
| 4,846,076 A | | 7/1989 | Menges, Sr. et al. | |
| 5,170,516 A | * | 12/1992 | Davison | A47K 11/00 |
| | | | | 297/188.09 |
| 5,303,500 A | * | 4/1994 | Luukonen | A01K 97/01 |
| | | | | 206/315.11 |
| 5,429,265 A | * | 7/1995 | Maire | B25H 3/00 |
| | | | | 206/372 |

(Continued)

*Primary Examiner* — Timothy J Brindley
(74) *Attorney, Agent, or Firm* — The Law Office of Patrick F. O'Reily III, LLC

(57) ABSTRACT

A seat assembly for a bucket is disclosed herein. The seat assembly includes a seat back portion; and a seat portion coupled to the seat back portion, the seat portion being in the form of a bucket lid configured to engage a top peripheral rim of a bucket so as to enable the bucket to be used as a seat for a user that provides back support for the user while the user is in a seated position. In one or more embodiments, at least one latching device is configured to secure the seat portion of the seat assembly to the bucket, and the at least one latching device is configured to engage an outwardly extending rim of the bucket.

20 Claims, 13 Drawing Sheets

(56) References Cited

U.S. PATENT DOCUMENTS

| | | | | |
|---|---|---|---|---|
| 5,755,057 | A | * | 5/1998 | Dancer .................. A01K 97/06 206/315.11 |
| 5,938,276 | A | | 8/1999 | Munoz et al. |
| 5,970,651 | A | * | 10/1999 | Torkilsen ............... A01K 97/01 206/315.11 |
| 6,938,761 | B2 | * | 9/2005 | Nish ........................ A45C 3/00 206/315.11 |
| 7,017,297 | B1 | * | 3/2006 | Ward ..................... A01K 97/20 43/55 |
| 7,055,907 | B1 | * | 6/2006 | Tilby ..................... A47C 7/021 297/380 |
| 7,341,314 | B1 | * | 3/2008 | Boyd ...................... A47C 9/10 297/188.09 |
| 7,467,590 | B1 | * | 12/2008 | Meller .................. A47B 37/00 108/90 |
| 7,597,392 | B1 | * | 10/2009 | Gilmore ................... A47C 7/62 297/217.1 |
| D688,434 | S | * | 8/2013 | Kinskey ........................ D32/53 |
| D693,137 | S | * | 11/2013 | Bracci ............................ D6/349 |
| 9,072,382 | B2 | * | 7/2015 | Johansson ............. A47C 4/021 |
| 9,078,526 | B1 | * | 7/2015 | Kammeyer ............. A47C 13/00 |
| 10,010,180 | B2 | * | 7/2018 | Anastos .................... A47C 9/10 |
| 10,624,459 | B1 | * | 4/2020 | Lykouretzos .......... A47C 7/628 |
| 2006/0219586 | A1 | * | 10/2006 | Phillips .................. A47L 13/51 206/373 |
| 2008/0006260 | A1 | * | 1/2008 | Godbout ................ A01K 97/01 126/204 |
| 2011/0283474 | A1 | * | 11/2011 | McCoy .................. A47L 13/52 15/257.1 |
| 2015/0007603 | A1 | * | 1/2015 | Keenan ..................... F25D 3/08 62/419 |
| 2018/0079555 | A1 | * | 3/2018 | Lee, Jr. .................... A47J 47/18 |

\* cited by examiner

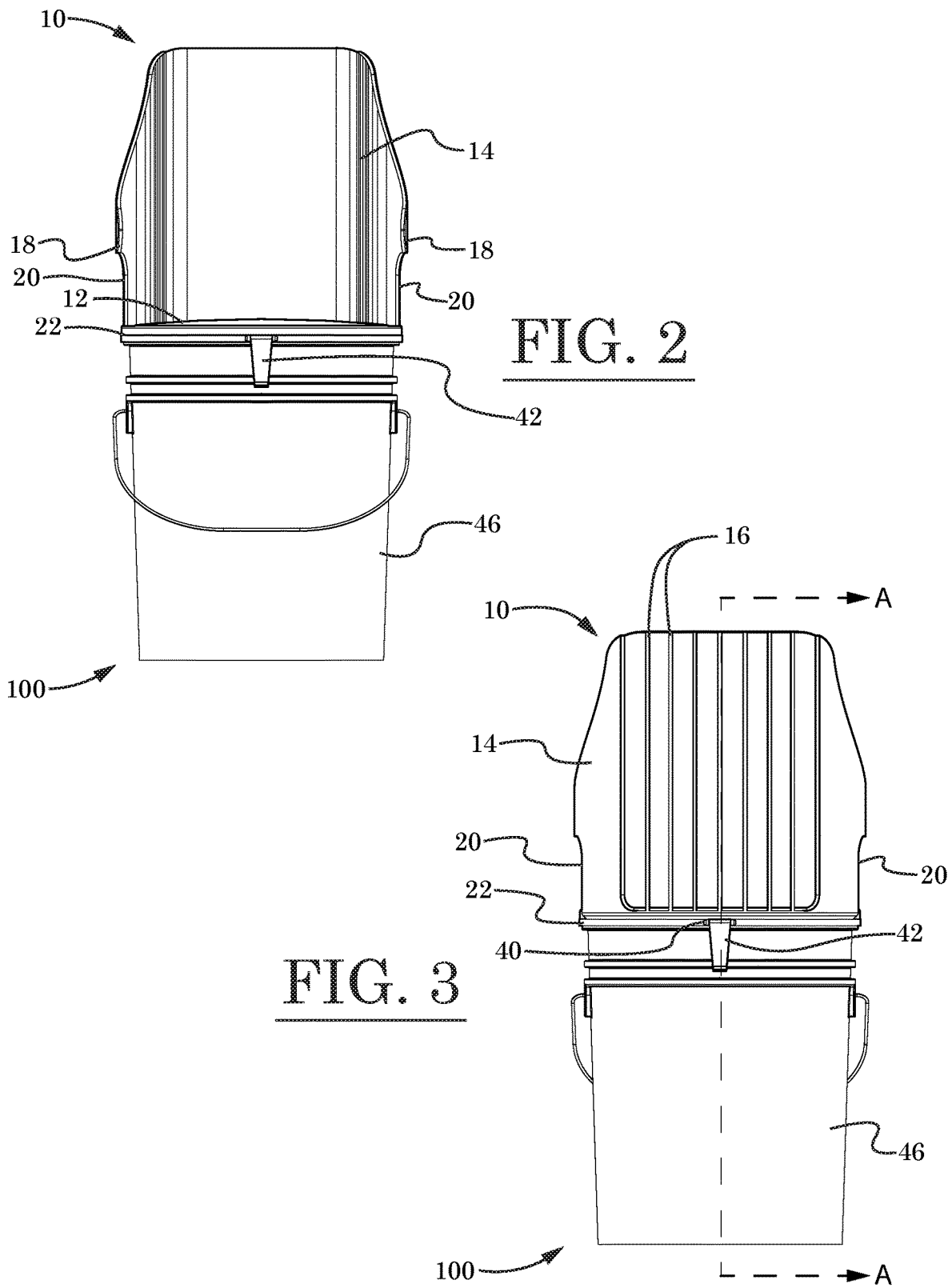

Section A-A

Detail "A"

Detail "B"

Detail "C"

SEAT ASSEMBLY FOR A BUCKET

CROSS-REFERENCE TO RELATED APPLICATIONS

This patent application claims priority to, and incorporates by reference in its entirety, U.S. Provisional Patent Application No. 62/817,157, entitled "Seat Assembly For A Bucket", filed on Mar. 12, 2019.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a seat assembly for a bucket. More particularly, the invention relates to a seat assembly for a bucket that enables the bucket to be used as a seat for a user with back support.

2. Background

Buckets are used for many different purposes. For example, when fishing, people often use buckets for carrying bait and/or other fishing gear. Also, because the lid of the bucket provides an elevated surface for sitting, a user may also use the bucket as a seat during the performance of certain activities, such as fishing. However, after sitting on a bucket for an extended period of time, most people experience a sore back from leaning forward. In addition, for a fisherman, it can be difficult to carry multiple fishing poles, an umbrella, fishing gear, and live bait in a bucket to a fishing location. Also, while standard buckets are commonly used as seats by fishermen and others, there are definite problems that result from the use of buckets as seats, such as comfort issues and convenience of use.

Therefore, what is needed is a seat assembly for a bucket that provides back support for a user when the user is in a seated position. Moreover, a seat assembly for a bucket is needed that is versatile and has many possible uses, such as being used at sporting events, concerts, and during fishing. Furthermore, there is a need for a bucket seat assembly that enhances the travel/storage capabilities of the bucket, rather than inhibiting those capabilities.

BRIEF SUMMARY OF EMBODIMENTS OF THE INVENTION

Accordingly, the present invention is directed to a seat assembly for a bucket that substantially obviates one or more problems resulting from the limitations and deficiencies of the related art.

In accordance with one or more embodiments of the present invention, there is provided a seat assembly for a bucket that includes a seat back portion; and a seat portion coupled to the seat back portion, the seat portion being in the form of a bucket lid configured to engage a top peripheral rim of a bucket so as to enable the bucket to be used as a seat for a user that provides back support for the user while the user is in a seated position.

In a further embodiment of the present invention, the seat back portion further comprises one or more protruding rib members disposed on a rear side of the seat back portion, the one or more protruding rib members configured to removably engage with one or more corresponding slots on one or more accessories.

In yet a further embodiment, the one or more accessories removably engageable with the seat back portion of the seat assembly are selected from the group consisting of: (i) a storage box for holding personal items of the user, (ii) a fishing pole holder for supporting a fishing pole in a generally upright position, and (iii) combinations thereof.

In still a further embodiment, the seat assembly further comprises a seat cushion disposed on a top surface of the seat portion, the seat cushion being formed from a padded material so as to increase the comfort of the user while in the seated position.

In yet a further embodiment, the seat back portion further comprises at least one protrusion configured to support a hip area of the user while in the seated position. In still a further embodiment, the seat assembly further defines a notched area between the at least one protrusion of the seat back portion and the seat portion, the notched area configured to allow a handle of the bucket to be raised to a substantially vertical position.

In yet a further embodiment, the seat assembly further comprises at least one latching device configured to secure the seat portion of the seat assembly to the bucket, the at least one latching device configured to engage an outwardly extending rim of the bucket.

In still a further embodiment, the seat assembly is configured to be rotatably disposed on the top peripheral rim of the bucket so as to allow the user to swivel the seat assembly while in the seated position.

In yet a further embodiment, the seat assembly is configured to be invertible on the bucket with the seat back portion facing downwardly in an inverted position, the inverted position of the seat assembly allowing the seat assembly to be more compact for transportation and storage.

In accordance with one or more other embodiments of the present invention, there is provided a seat assembly for a bucket that includes a seat back portion; a seat portion coupled to the seat back portion, the seat portion being in the form of a bucket lid configured to engage a top peripheral rim of a bucket so as to enable the bucket to be used as a seat for a user that provides back support for the user while the user is in a seated position; and at least one latching device configured to secure the seat portion of the seat assembly to the bucket, the at least one latching device configured to engage an outwardly extending rim of the bucket.

In a further embodiment of the present invention, the seat back portion further comprises one or more protruding rib members disposed on a rear side of the seat back portion, the one or more protruding rib members configured to removably engage with one or more corresponding slots on one or more accessories.

In yet a further embodiment, the one or more accessories removably engageable with the seat back portion of the seat assembly are selected from the group consisting of: (i) a storage box for holding personal items of the user, (ii) a fishing pole holder for supporting a fishing pole in a generally upright position, and (iii) combinations thereof.

In still a further embodiment, the seat assembly further comprises a seat cushion disposed on a top surface of the seat portion, the seat cushion being formed from a padded material so as to increase the comfort of the user while in the seated position.

In yet a further embodiment, the seat back portion further comprises at least one protrusion configured to support a hip area of the user while in the seated position.

In still a further embodiment, the seat assembly further defines a notched area between the at least one protrusion of the seat back portion and the seat portion, the notched area configured to allow a handle of the bucket to be raised to a substantially vertical position.

In yet a further embodiment, the seat assembly is configured to be rotatably disposed on the top peripheral rim of the bucket so as to allow the user to swivel the seat assembly while in the seated position.

In still a further embodiment, the seat assembly is configured to be invertible on the bucket with the seat back portion facing downwardly in an inverted position, the inverted position of the seat assembly allowing the seat assembly to be more compact for transportation and storage.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 2 is a front elevational view of the bucket seat system of FIG. 1;

FIG. 3 is a rear elevational view of the bucket seat system of FIG. 1;

Throughout the figures, the same parts are always denoted using the same reference characters so that, as a general rule, they will only be described once.

DETAILED DESCRIPTION OF EMBODIMENTS OF THE INVENTION

Figure 1:
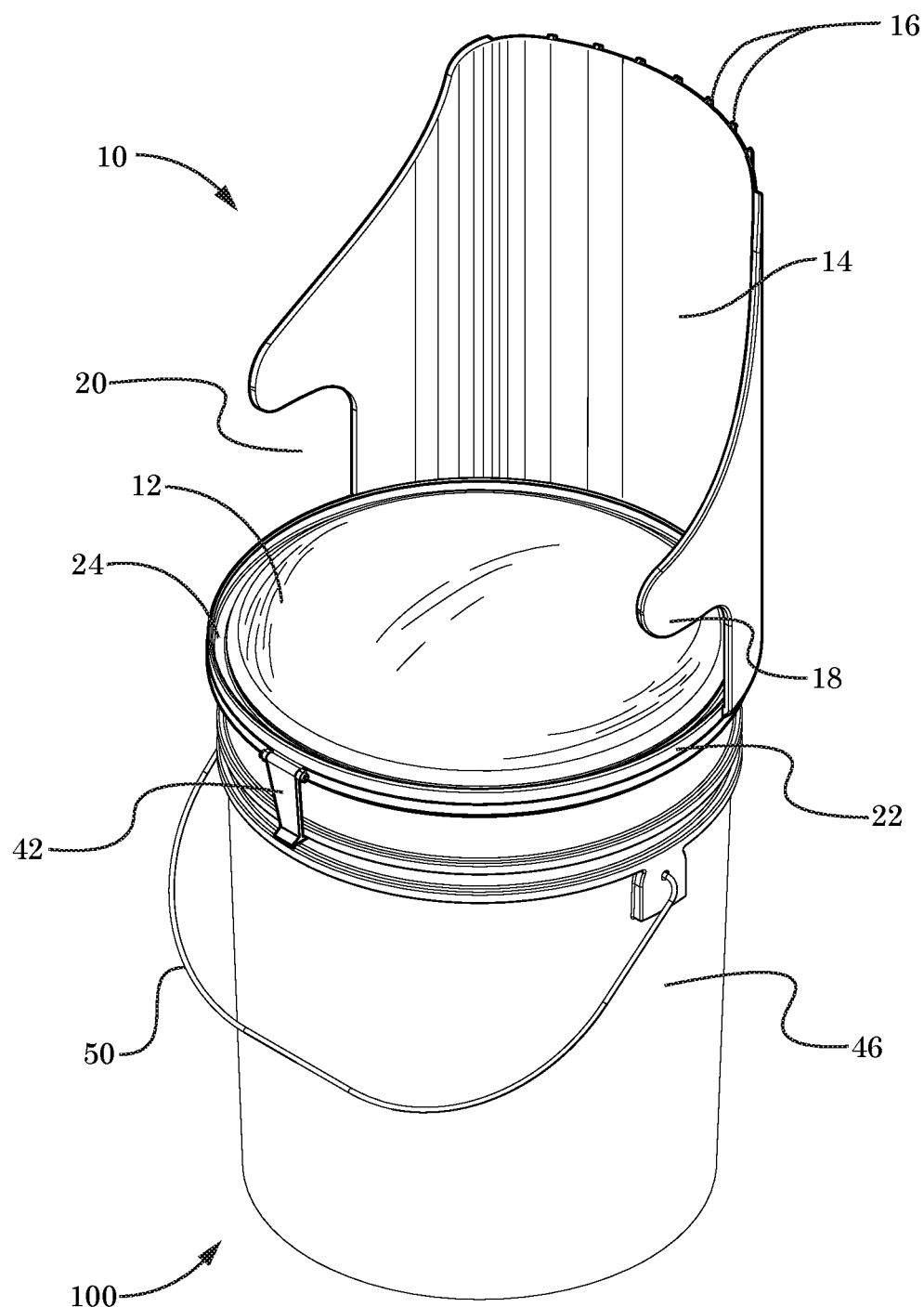
FIG. 1 is a top-front perspective view of a bucket seat system that includes the bucket seat assembly, according to an illustrative embodiment of the invention.
Figure 4:
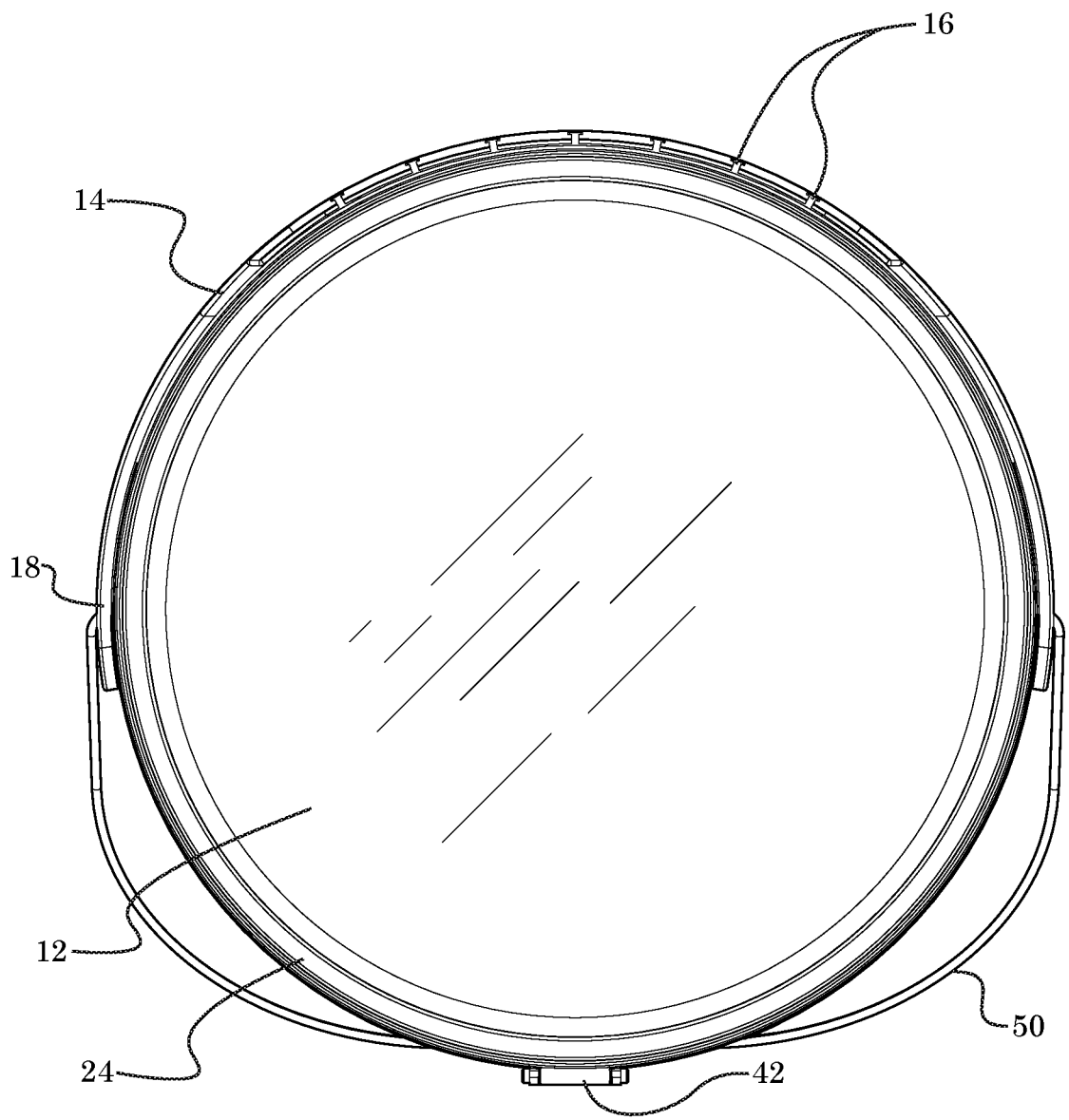
FIG. 4 is a top plan view of the bucket seat system of FIG. 1.

An illustrative embodiment of a bucket seat system is seen generally at 100 in FIGS. 1-15. The bucket seat system 100 comprises a seat assembly 10 that is configured to be attached to the top of a bucket 46 (e.g., a fishing bucket). With initial reference to FIGS. 1 and 5, it can be seen that the seat assembly 10 generally comprises a seat back portion 14; a seat portion 22 coupled to the seat back portion 14, the seat portion 22 being in the form of a bucket lid configured to engage a top peripheral rim 48 of a bucket 46 (see FIG. 5) so as to enable the bucket 46 to be used as a seat for a user that provides back support for the user while the user is in a seated position; and a plurality of latching devices 42 configured to secure the seat portion 22 of the seat assembly 10 to the bucket 46, the plurality of latching devices 42 configured to engage an outwardly extending rim 56 of the bucket 46 (see FIGS. 7 and 10). In the illustrative embodiment, the bucket 46 of the bucket seat system 100 may comprise a standard 3-gallon or 5-gallon bucket that is used for a variety of different purposes, such as for a fishing bucket. Also, in the illustrative embodiment, the seat portion 22 of the seat assembly 10 is in the form of a custom designed lid that replaces the standard lid of the standard 3-gallon or 5-gallon bucket.

Figure 7:
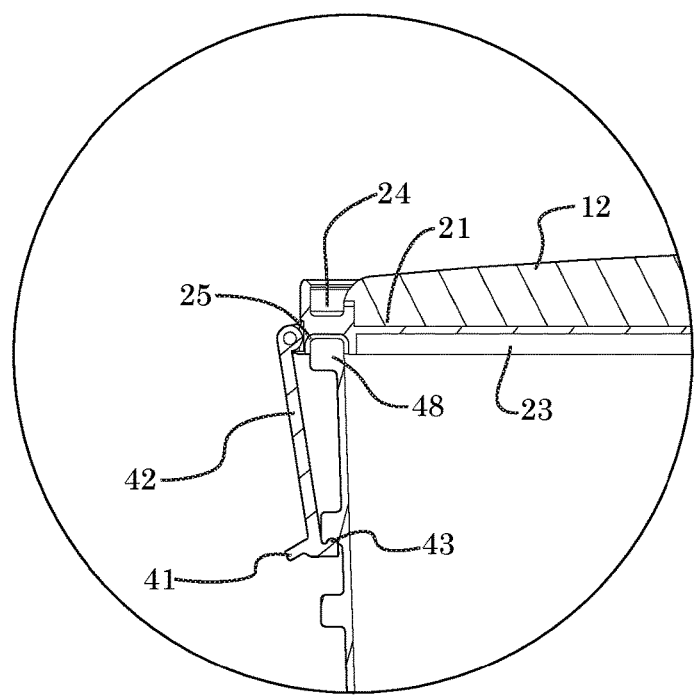
FIG. 7 is an enlarged sectional view illustrating the latching device of the seat assembly of the bucket seat system illustrated in FIG. 6 (Detail "A")

In the illustrated embodiment, with combined reference to FIGS. 1, 3, 5, 7, and 10, it can be seen that each latching device 42 is pivotally connected to the peripheral rim 24 of the seat portion 22 by a hinge pin 40 that engages with a latch connecting portion 26 on the outer side of the peripheral rim 24 (e.g., the latch connecting portion 26 may comprise outwardly extending tabs that retain the opposed ends of the hinge pin 40). As best shown in FIG. 7, when in the engaged position, the engagement protrusion 43 disposed on the end of each latching device 42 engages with the bottom portion of the outwardly extending rim 56 of the bucket 46. When a user wants to disengage each latching device 42 from the outwardly extending rim 56 of the bucket 46, he or she applies a pulling force on the grip protrusion 41 of the latching device 42, and rotates the latching device 42 outwardly away from the sidewall 54 of the bucket 46.

Figure 5:
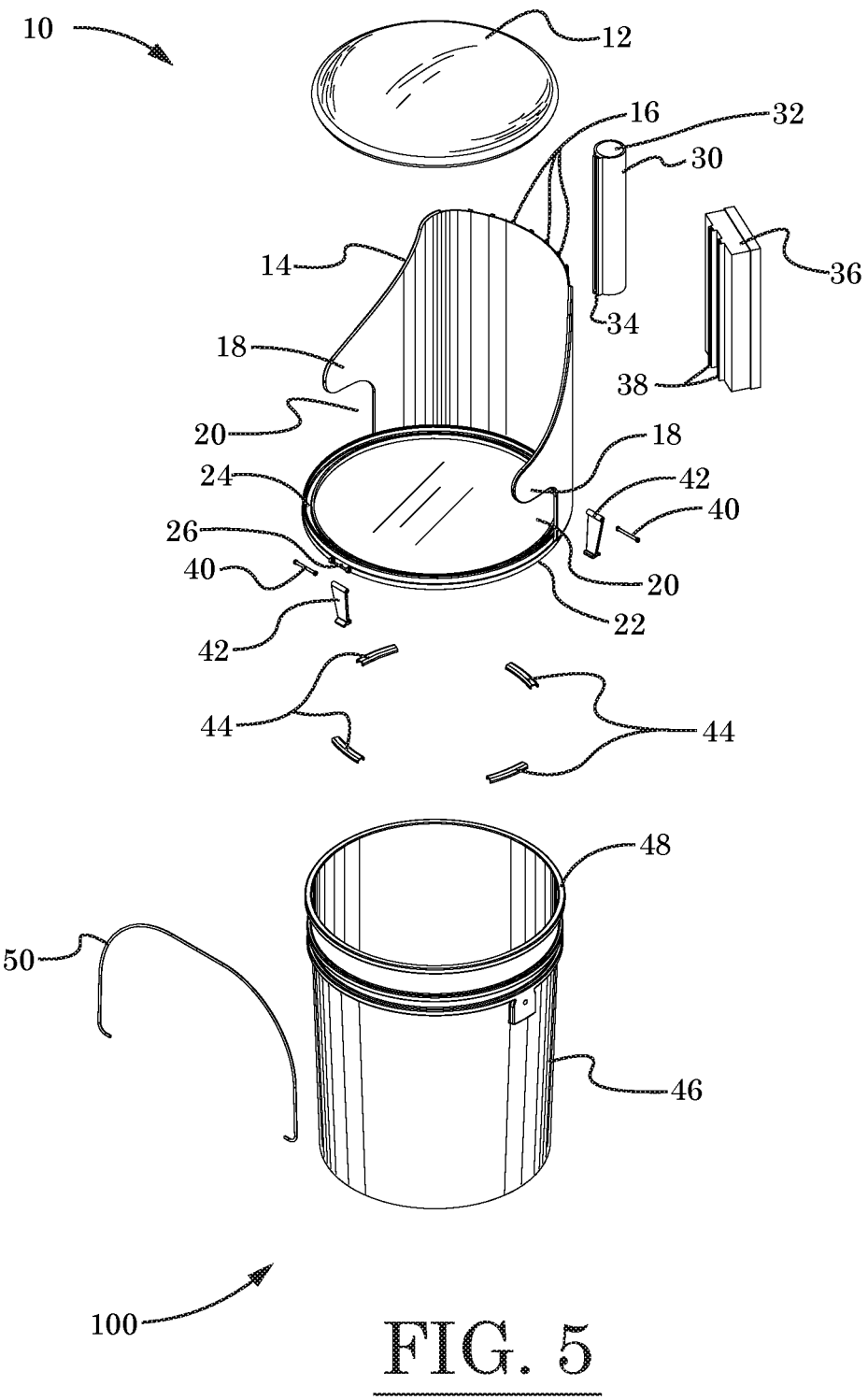
FIG. 5 is an exploded perspective view of the bucket seat system of FIG. 1.
Figure 6:
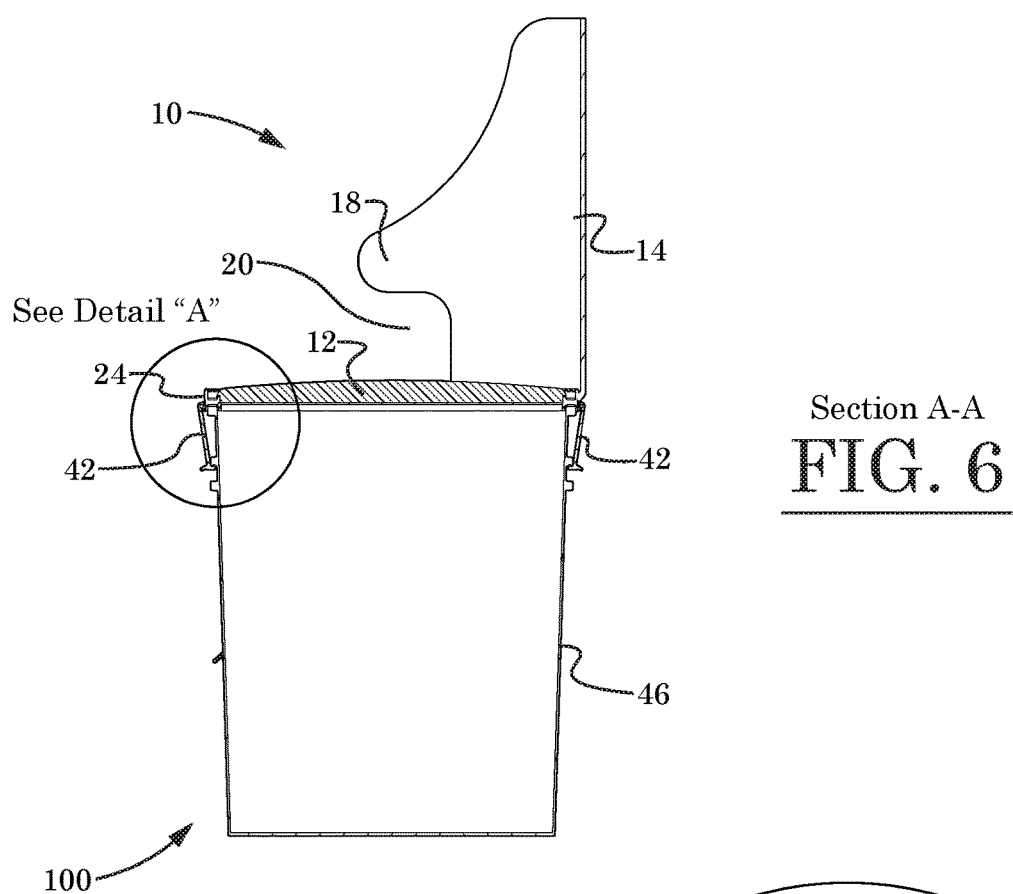
FIG. 6 is a sectional view cut through the bucket seat system of FIG. 1, wherein the section is generally cut along the cutting-plane line A-A in FIG. 3.

As shown in FIGS. 1 and 5, in the illustrative embodiment, the seat assembly 10 further comprises a seat cushion 12 disposed on a top surface of the seat portion 22. The seat cushion 12 may be formed from a padded material (e.g., a padded vinyl seat cushion) so as to increase the comfort of the user while in a seated position on the seat assembly 10. As shown in FIG. 7, the top side of the seat portion 22 of the seat assembly 10 is provided with a top circular recess 21 for accommodating the seat cushion 12 therein. The opposite, bottom side of the seat portion 22 of the seat assembly 10 is provided with a similar bottom circular recess 23 formed therein. In the illustrative embodiment, the top circular recess 21 and the bottom circular recess 23 are each provided with a flat planar bottom surface (see FIGS. 6 and 7).

Figure 8:
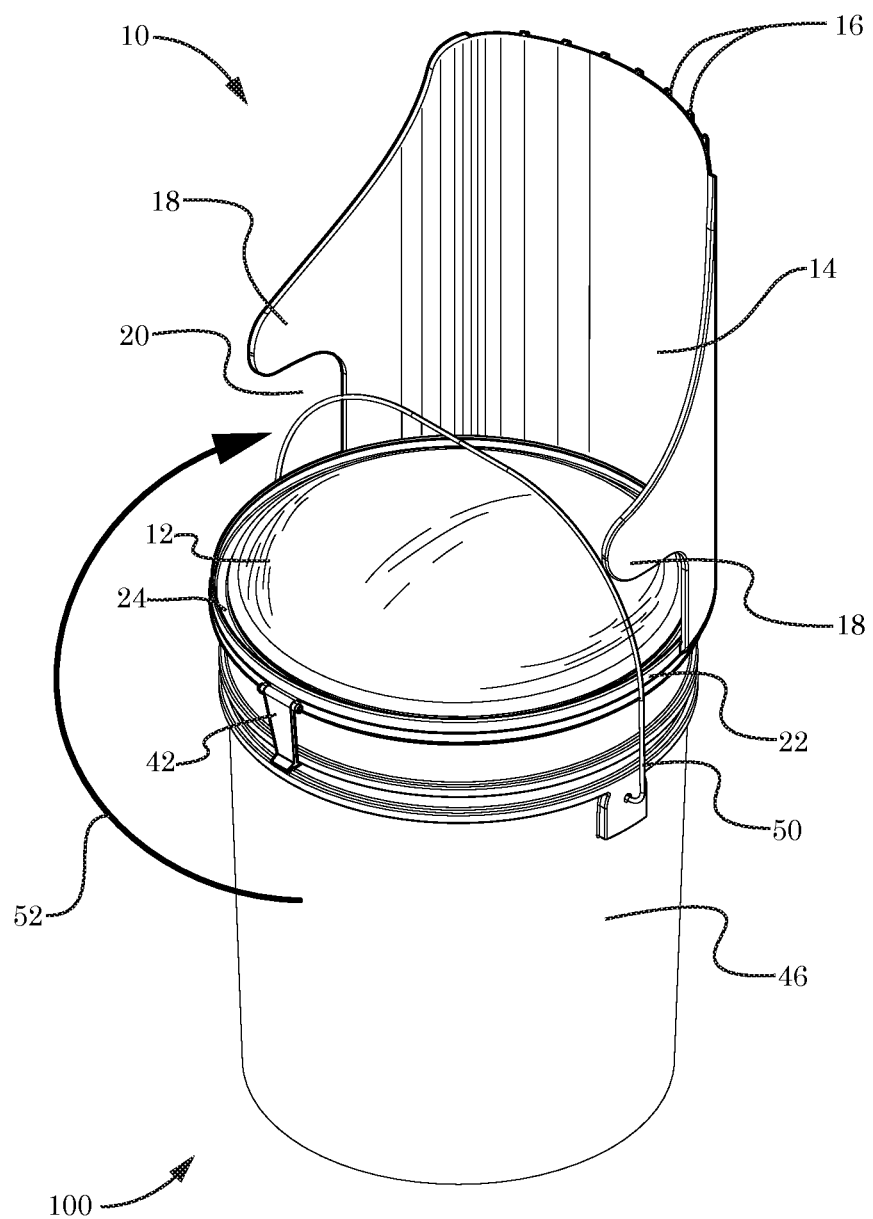
FIG. 8 is another top-front perspective view of the bucket seat system of FIG. 1, wherein the swivelable nature of the seat assembly is illustrated therein.

Also, as shown in FIGS. 1 and 5, the seat back portion 14 of the illustrative embodiment comprises a pair of outwardly extending protrusions 18 configured to support a hip area of the user while in the seated position. In the illustrative embodiment, the seat assembly 10 further defines a notched area 20 between each protrusion 18 of the seat back portion 14 and the seat portion 22. The notched area 20 is configured to allow a handle 50 of the bucket 46 to be raised to a substantially vertical position or vertical position (e.g., as shown in FIG. 8). As such, when the seat assembly 10 is installed on the bucket 46, it advantageously does not interfere with the normal vertical positioning of the bucket handle 50 (e.g., while the bucket seat system 100 is being carried by a user).

As diagrammatically represented in FIG. 8 by the curved arrow 52, in the illustrative embodiment, the seat assembly 10 is configured to be rotatably disposed on the top peripheral rim 48 of the bucket 46 so as to allow the user to swivel the seat assembly 10 while in the seated position (e.g., for the added comfort of the user, or to give the user added visibility when seated). Turning to FIG. 5, it can be seen that four (4) curved seat spacer members 44 may be provided underneath the peripheral rim 24 of the seat portion 22 to facilitate the swiveling of the seat assembly 10 relative to the top peripheral rim 48 of the bucket 46. In the illustrative embodiment, the curved seat spacer members 44 may be formed from a polymeric material or plastic having a low frictional coefficient (e.g., a polyethylene material), and the curved seat spacer members 44 may have a length of approximately 2 inches. The curved seat spacer members 44 are designed to snap into the bottom circumferential groove 25 in the peripheral rim 24 of the seat portion 22. To facilitate the swiveling of the seat assembly 10 on the top peripheral rim 48 of the bucket 46, a user may unlatch the latching devices 42 when disposed in the seated position.

Figure 9:
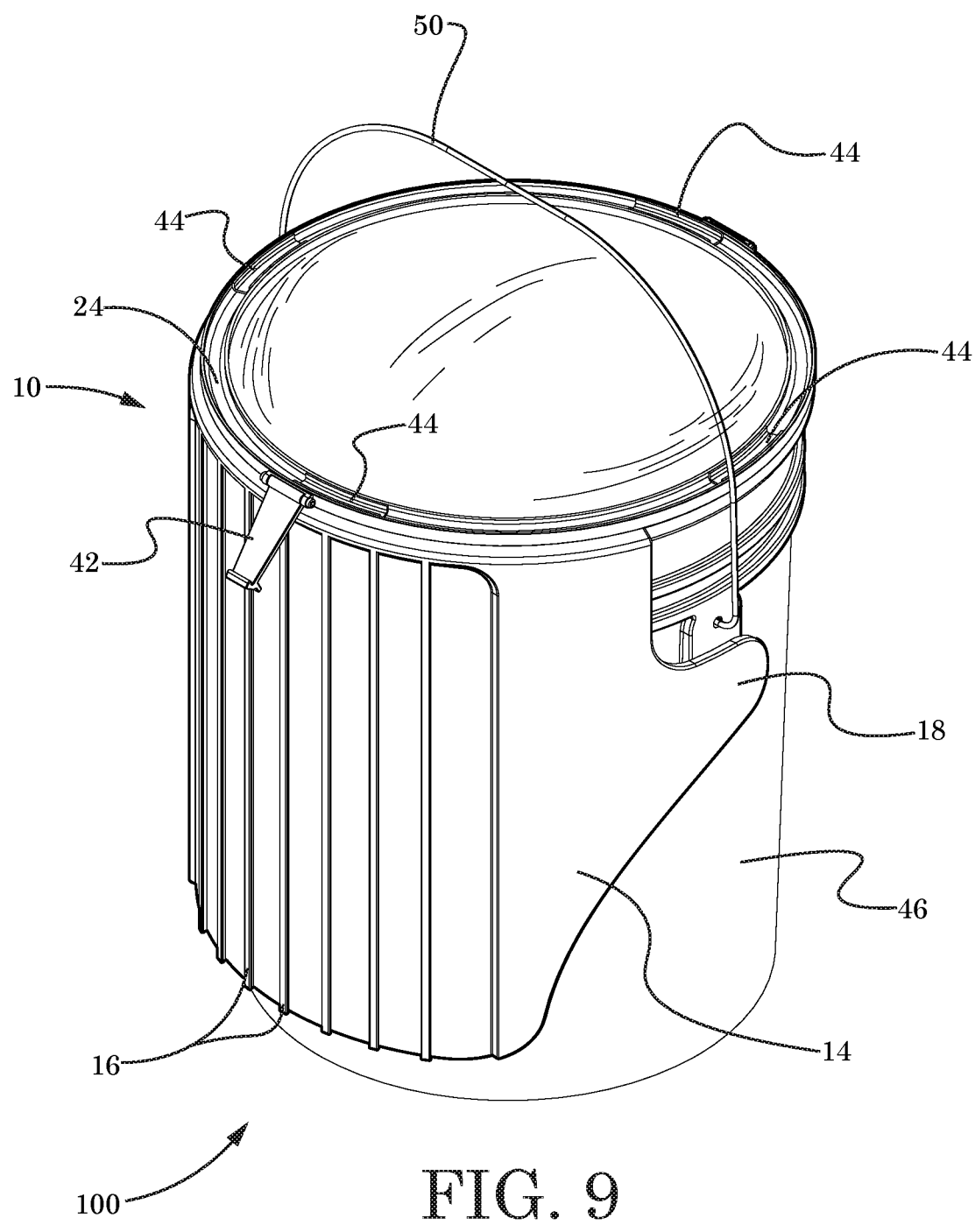
FIG. 9 is a top-rear perspective view of the bucket seat system of FIG. 1, wherein the seat assembly of the bucket seat system is depicted in its inverted, stowed position.
Figure 10:
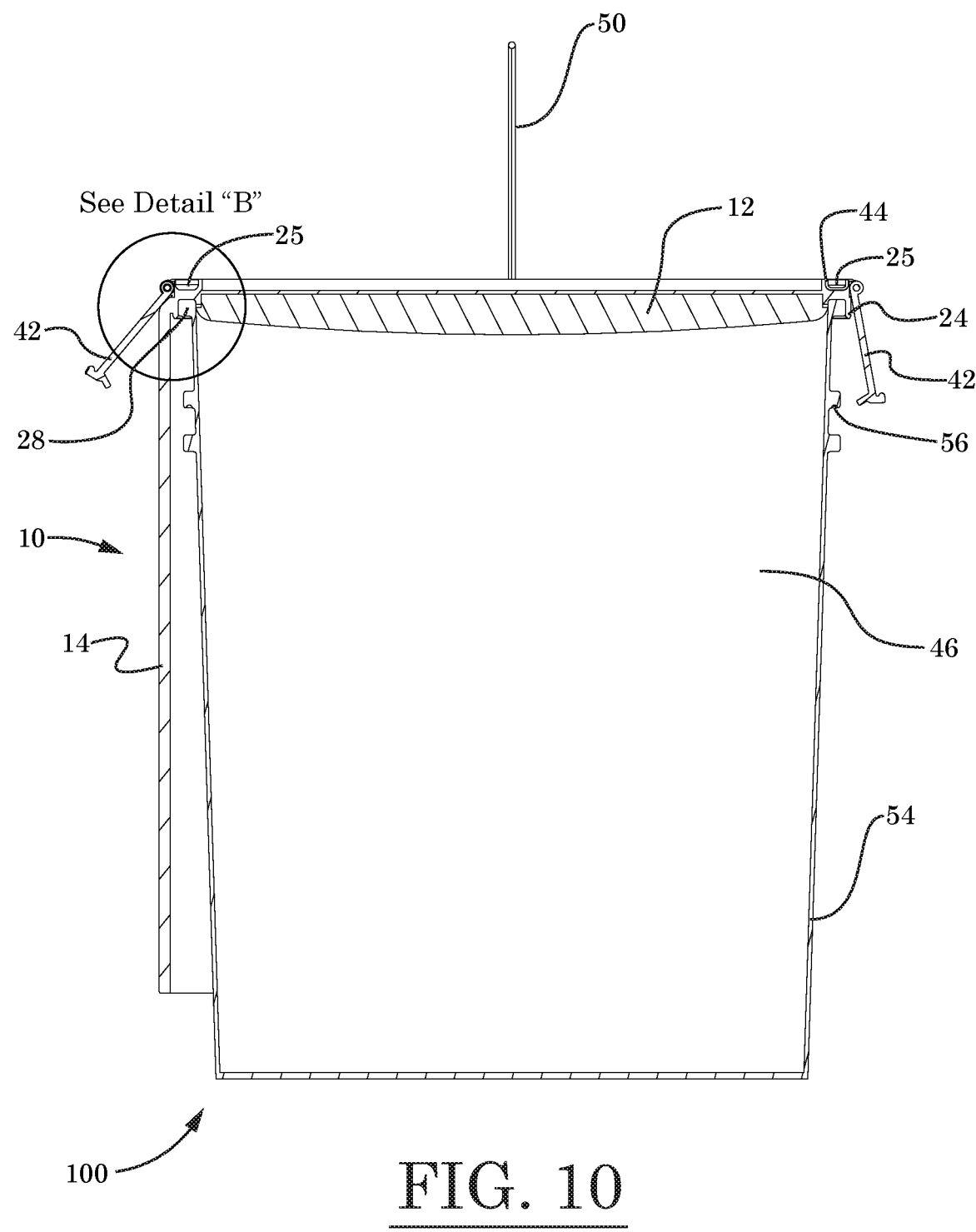
FIG. 10 is a sectional view cut through the bucket seat system of FIG. 9, wherein the seat assembly is in its inverted, stowed position.
Figure 11:
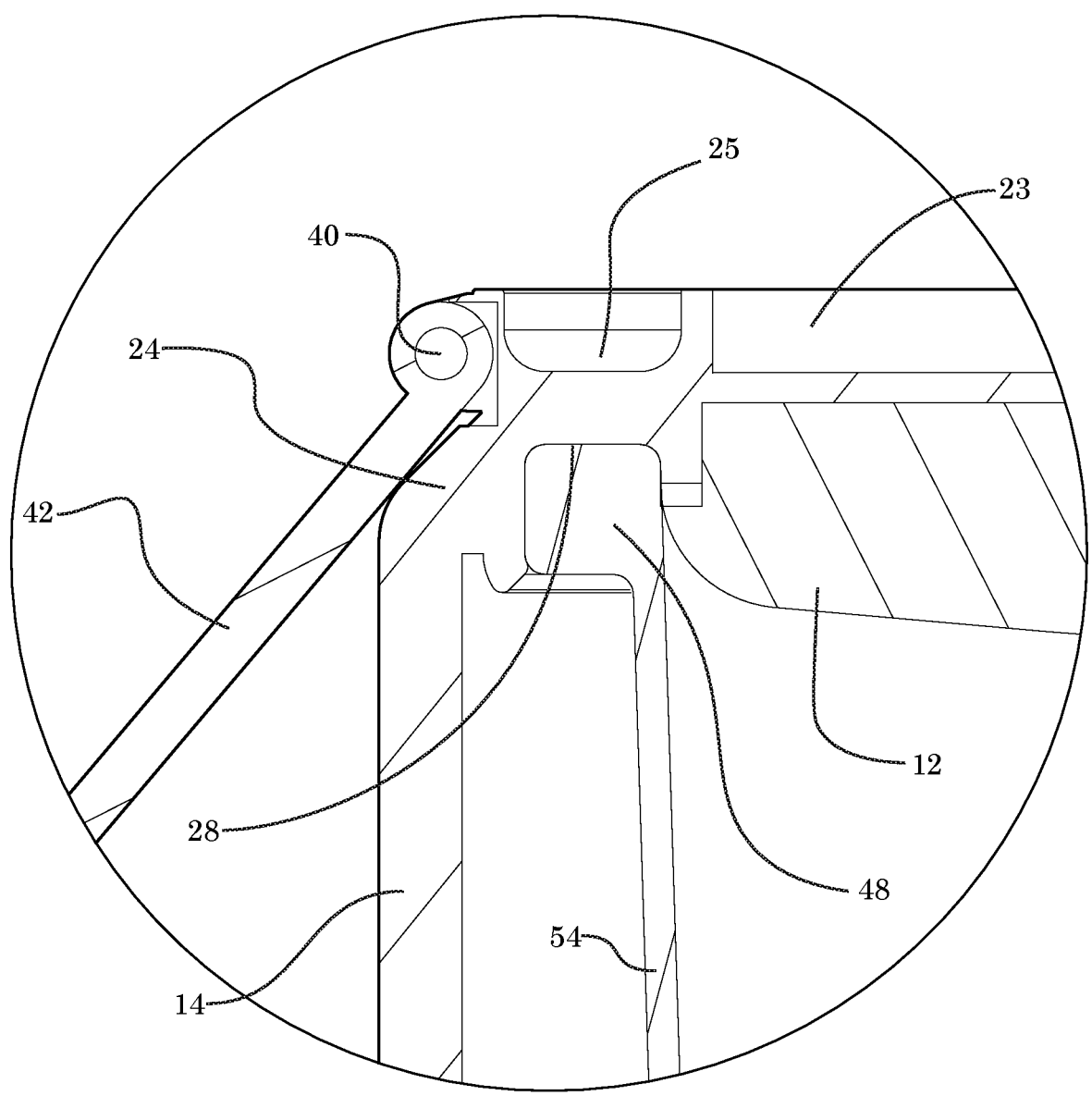
FIG. 11 is an enlarged sectional view of a portion of FIG. 10, wherein the engagement between the seat portion of the seat assembly and the top peripheral rim of the bucket is illustrated when the seat assembly is in its inverted, stowed position (Detail "B")

In the illustrative embodiment, as shown in FIGS. 9-11, the seat assembly 10 is configured to be invertible on the bucket 46 with the seat back portion 14 facing downwardly in an inverted position (i.e., a stowed, inoperative position of the seat back portion 14). As shown in FIG. 10, in the illustrative embodiment, the sidewall 54 of the bucket 46 of the bucket seat system 100 has a slight upward taper that accommodates the seat back portion 14 in its inverted position with the lid-like seat portion 22 of the seat assembly 10 flipped upside down. Advantageously, the inverted position of the seat assembly 10 in FIGS. 9 and 10 allows the seat assembly 10 to be more compact for transportation and storage. As best illustrated in the detail view of FIG. 11, the peripheral rim 24 of the seat portion 22 comprises opposed circumferential groove portions 25, 28, wherein each circumferential groove portion 25, 28 is designed to engage with the top peripheral rim 48 of the bucket 46. In the non-inverted position (i.e., the operative backrest position) of the seat assembly 10 depicted in FIGS. 1 and 8, the top circumferential groove portion 28 is located in the upper portion of the peripheral rim 24 of the seat portion 22, and the bottom circumferential groove portion 25 is located in the lower portion of the peripheral rim 24 of the seat portion 22. The circumferential groove portions 25, 28 are interchangeably designed to engage with the top peripheral rim 48 of the bucket 46. When the seat assembly 10 is in its non-inverted position of FIGS. 1 and 8, the bottom circumferential groove portion 25 is engaged with the top peripheral rim 48 of the bucket 46 (as shown in the view of FIG. 7). Conversely, when the seat assembly 10 is in its inverted position of FIGS. 9 and 10, the top circumferential groove portion 28 is engaged with the top peripheral rim 48 of the bucket 46 (as shown in the view of FIG. 11).

Figure 12:
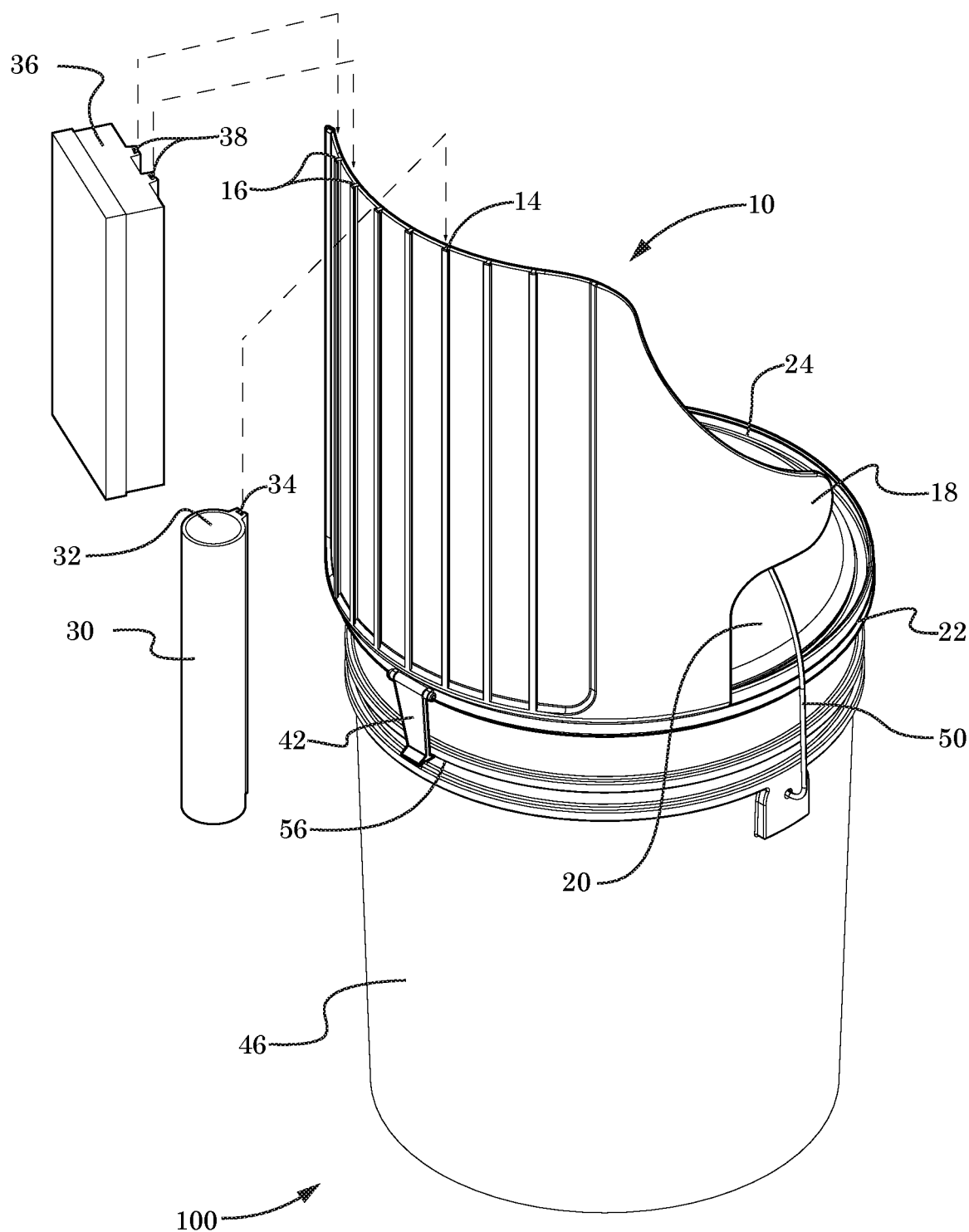
FIG. 12 is a rear perspective view of the bucket seat system of FIG. 1, wherein the manner in which accessories are attached to the back of the seat is illustrated.
Figure 13:
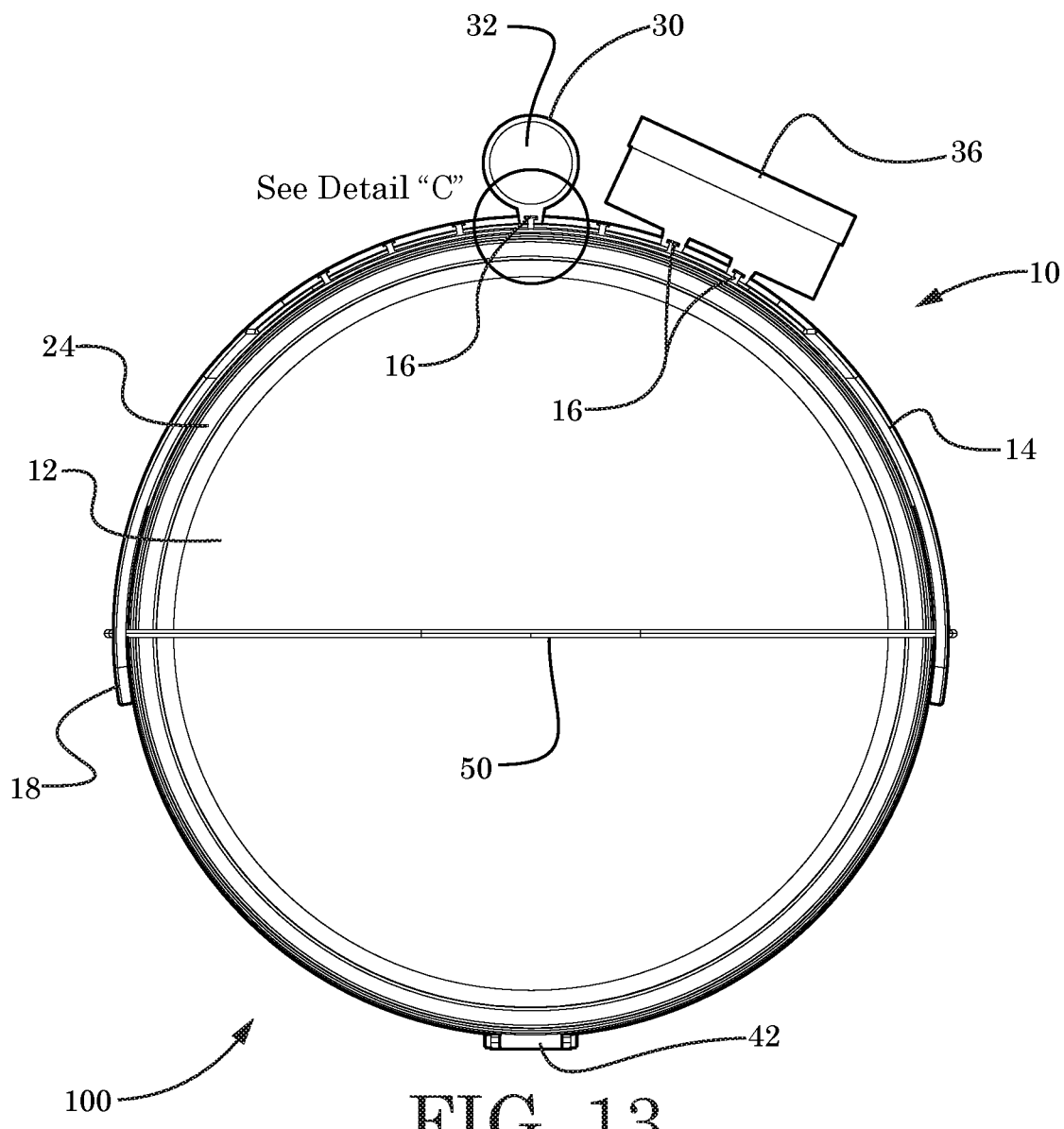
FIG. 13 is another top plan view of the bucket seat system of FIG. 1, wherein accessories are shown attached to the back of the seat.
Figure 14:
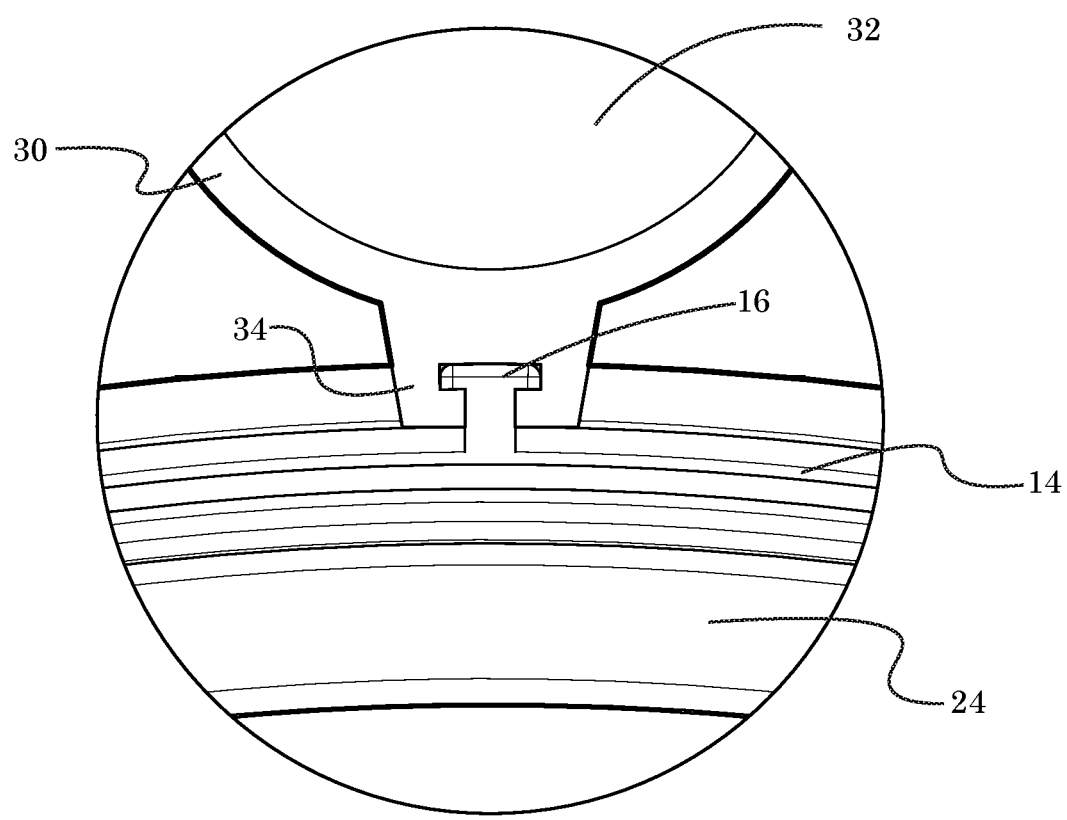
FIG. 14 is an enlarged plan view of a portion of FIG. 13, wherein the accessory attachment structure is illustrated in further detail (Detail "C")
Figure 15:
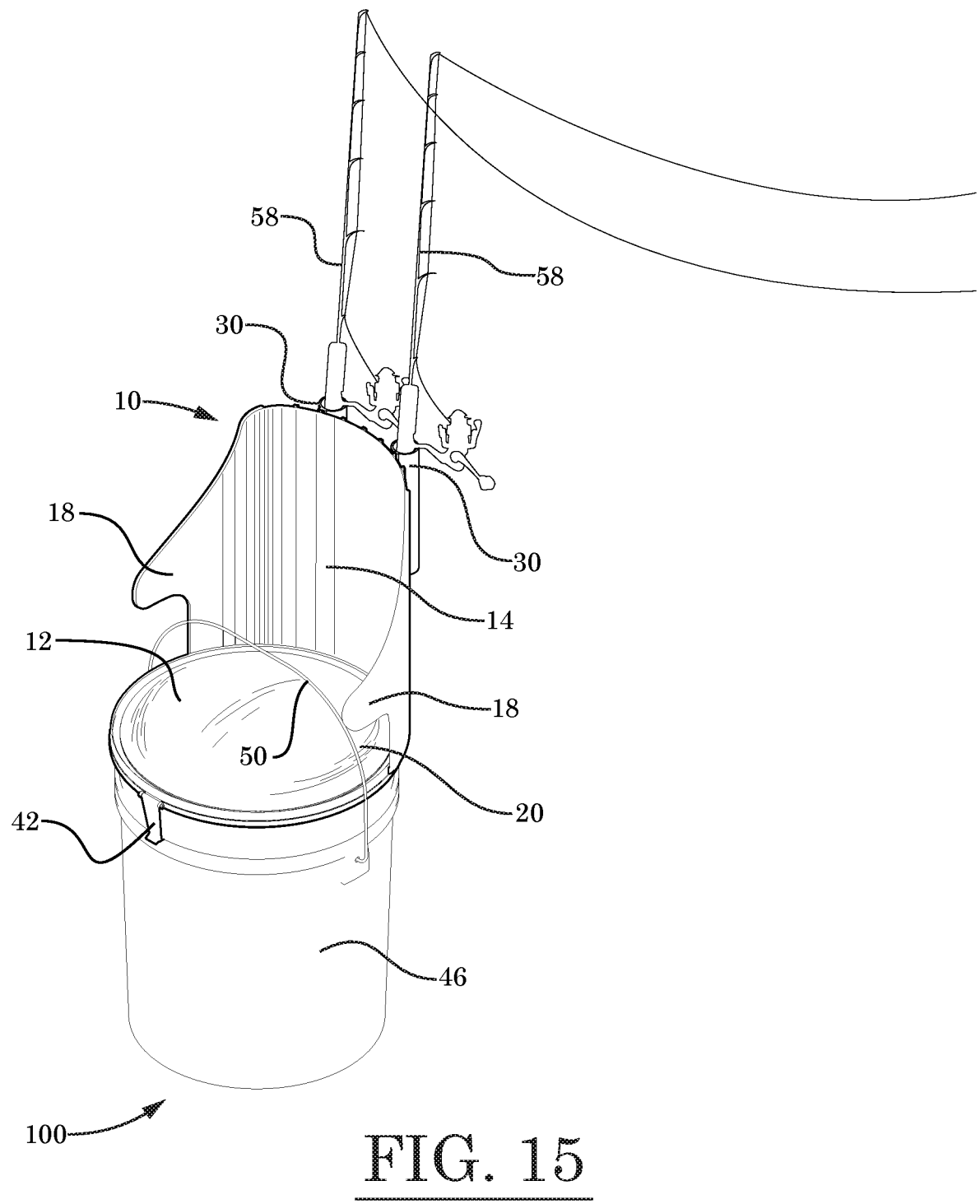
FIG. 15 is another top-front perspective view of the bucket seat system of FIG. 1, wherein accessories for holding fishing poles are shown attached to the back of the seat.

Now, referring to FIGS. 3-5 and 12-15, the accessory features of the illustrative seat assembly 10 of the bucket seat system 100 will be described. In the illustrative embodiment, as best shown in FIGS. 12-14, the seat back portion 14 of the seat assembly 10 further comprises a plurality of protruding rib members 16 (or spine members 16) disposed on a rear side of the seat back portion 14. As will be explained hereinafter, the protruding rib members 16 are configured to removably engage with one or more corresponding slots on one or more accessories (see FIGS. 13 and 14). In the illustrative embodiment, each of the protruding rib members 16 may have a generally T-shaped cross-section that corresponds to a generally T-shaped slot within an accessory protrusion 34, 38 of an accessory 30, 36 (see FIGS. 12-14). In the illustrative embodiment, the accessories 30, 36 that are removably engageable with the seat back portion 14 of the seat assembly 10 are selected from the group consisting of: (i) a storage box 36 for holding personal items of the user (see FIGS. 12 and 13), (ii) a fishing pole holder 30 for supporting a fishing pole 58 in a generally upright position (see FIGS. 12, 13, and 15), and (iii) combinations thereof. For example, as depicted in FIGS. 5, 12, and 13, the storage box accessory 36 may comprise a pair of spaced-apart protrusions 38 on the back side thereof that contain generally T-shaped slots for engaging with respective protruding rib members 16 (as shown in FIG. 13). The front lid of the storage box 36 may be removable so that a user is able to store personal items in the storage box 36, such as a wallet, keys, etc. As another example, referring again to FIGS. 5, 12, and 13, the cylindrical fishing pole holder 30 may comprise an interior cylindrical cavity 32 disposed therein for accommodating a fishing pole 58, and a protrusion 34 on the back side thereof that contains a generally T-shaped slot for engaging with a respective protruding rib member 16 (as shown in FIG. 13). In FIG. 15, it can be seen that the interior cylindrical cavity 32 of each cylindrical fishing pole holder 30 attached to the backside of the seat back portion 14 of the seat assembly 10 may be used to accommodate a respective fishing pole 58 therein (i.e., the bucket seat system 100 for fishing). In other embodiments, different accessories may be used with the seat assembly 10 that are suitable for other possible applications of the seat assembly 10.

In the illustrative embodiment, in order to help prevent accessories from sliding down the backside of the seat back portion 14 of the seat assembly 10, each of the protruding rib members 16 on the backside of the seat back portion 14 may be provided with a slight outward taper towards the bottom of the seat back portion 14 (i.e., a slight draft angle towards the bottom of the seat back portion 14). In other words, the cross-sectional area of each protruding rib member 16 may get slightly larger from the top end thereof to the bottom end thereof so that the accessories 30, 36 will not inadvertently slide down the back of the seat back portion 14. The dashed arrows in FIG. 12 diagrammatically illustrate the manner in which the accessories 30, 36 are attached to the backside of the seat back portion 14. In addition to being used for attaching accessories 30, 36 to the backside of the seat back portion 14, the protruding rib members 16 also advantageously increase the structural rigidity of the seat back portion 14 so that the seat back portion 14 does excessively deflect when a user applies his or her weight against the seat back portion 14.

It is readily apparent that the aforedescribed seat assembly 10 for a bucket offers numerous advantages. First, seat assembly 10 provides back support for a user when the user is in a seated position. Secondly, the seat assembly 10 is versatile and has many possible uses, such as being used at sporting events, concerts, and during fishing. For example, when used for fishing, the seat back portion 14 of the seat assembly 10 provides back support for the fisherman in its non-inverted operative position, and the seat assembly 10 provides means for carrying fishing gear (e.g., fishing poles, fishing tackle, an umbrella, etc.) in its inverted inoperative position (i.e. its travel/storage position). Finally, the seat assembly 10 enhances the travel/storage capabilities of the bucket 46, rather than inhibiting those capabilities.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A seat assembly for a bucket, the seat assembly comprising:
   a seat back portion; and
   a seat portion coupled to the seat back portion, the seat portion being in the form of a bucket lid configured to engage a top peripheral rim of a bucket so as to enable the bucket to be used as a seat for a user that provides back support for the user while the user is in a seated position;
   wherein the seat assembly is configured to be invertible on the bucket with the seat back portion facing downwardly in an inverted position, the inverted position of the seat assembly allowing the seat assembly to be more compact for transportation and storage.

2. The seat assembly according to claim 1, wherein the seat back portion further comprises one or more protruding rib members disposed on a rear side of the seat back portion, the one or more protruding rib members configured to removably engage with one or more corresponding slots on one or more accessories.

3. The seat assembly according to claim 2, wherein the one or more accessories removably engageable with the seat back portion of the seat assembly are selected from the group consisting of: (i) a storage box for holding personal items of the user, (ii) a fishing pole holder for supporting a fishing pole in a generally upright position, and (iii) combinations thereof.

4. The seat assembly according to claim 1, further comprising a seat cushion disposed on a top surface of the seat portion, the seat cushion being formed from a padded material so as to increase the comfort of the user while in the seated position.

5. The seat assembly according to claim 1, wherein the seat back portion further comprises at least one protrusion configured to support a hip area of the user while in the seated position.

6. The seat assembly according to claim 5, wherein the seat assembly further defines a notched area between the at least one protrusion of the seat back portion and the seat portion, the notched area configured to allow a handle of the bucket to be raised to a substantially vertical position.

7. The seat assembly according to claim 1, further comprising at least one latching device configured to secure the seat portion of the seat assembly to the bucket, the at least one latching device configured to engage an outwardly extending rim of the bucket.

8. The seat assembly according to claim 1, wherein the seat assembly is configured to be rotatably disposed on the top peripheral rim of the bucket so as to allow the user to swivel the seat assembly while in the seated position.

9. A seat assembly for a bucket, the seat assembly comprising:
   a seat back portion;
   a seat portion coupled to the seat back portion, the seat portion being in the form of a bucket lid configured to engage a top peripheral rim of a bucket so as to enable the bucket to be used as a seat for a user that provides back support for the user while the user is in a seated position; and
   at least one latching device configured to secure the seat portion of the seat assembly to the bucket, the at least one latching device configured to engage an outwardly extending rim of the bucket;
   wherein the seat assembly is configured to be rotatably disposed on the top peripheral rim of the bucket so as to allow the user to swivel the seat assembly while in the seated position.

10. The seat assembly according to claim 9, wherein the seat back portion further comprises one or more protruding rib members disposed on a rear side of the seat back portion, the one or more protruding rib members configured to removably engage with one or more corresponding slots on one or more accessories.

11. The seat assembly according to claim 10, wherein the one or more accessories removably engageable with the seat back portion of the seat assembly are selected from the group consisting of: (i) a storage box for holding personal items of the user, (ii) a fishing pole holder for supporting a fishing pole in a generally upright position, and (iii) combinations thereof.

12. The seat assembly according to claim 9, further comprising a seat cushion disposed on a top surface of the seat portion, the seat cushion being formed from a padded material so as to increase the comfort of the user while in the seated position.

13. The seat assembly according to claim 9, wherein the seat back portion further comprises at least one protrusion configured to support a hip area of the user while in the seated position.

14. The seat assembly according to claim 13, wherein the seat assembly further defines a notched area between the at least one protrusion of the seat back portion and the seat portion, the notched area configured to allow a handle of the bucket to be raised to a substantially vertical position.

15. The seat assembly according to claim 9, wherein the seat assembly is configured to be invertible on the bucket with the seat back portion facing downwardly in an inverted position, the inverted position of the seat assembly allowing the seat assembly to be more compact for transportation and storage.

16. A seat assembly for a bucket, the seat assembly comprising:
 a seat back portion, the seat back portion including at least one protrusion configured to support a hip area of the user while in the seated position; and
 a seat portion coupled to the seat back portion, the seat portion being in the form of a bucket lid configured to engage a top peripheral rim of a bucket so as to enable the bucket to be used as a seat for a user that provides back support for the user while the user is in a seated position.

17. The seat assembly according to claim 16, wherein the seat assembly further defines a notched area between the at least one protrusion of the seat back portion and the seat portion, the notched area configured to allow a handle of the bucket to be raised to a substantially vertical position.

18. The seat assembly according to claim 16, further comprising at least one latching device configured to secure the seat portion of the seat assembly to the bucket, the at least one latching device configured to engage an outwardly extending rim of the bucket.

19. The seat assembly according to claim 16, further comprising a seat cushion disposed on a top surface of the seat portion, the seat cushion being formed from a padded material so as to increase the comfort of the user while in the seated position.

20. The seat assembly according to claim 16, wherein the seat assembly is configured to be rotatably disposed on the top peripheral rim of the bucket so as to allow the user to swivel the seat assembly while in the seated position.

\* \* \* \* \*